US009988554B2

(12) United States Patent
Watkins et al.

(10) Patent No.: US 9,988,554 B2
(45) Date of Patent: Jun. 5, 2018

(54) SPRAYABLE POLYURETHANE BASED PROTECTIVE COATING

(71) Applicant: Dow Global Technologies LLC, Midland, MI (US)

(72) Inventors: Avery L. Watkins, Pearland, TX (US); James Facello, Woodstock, GA (US)

(73) Assignee: Dow Global Technologies LLC ( * ) Notice: Subject to any disclaimer, the term of this patent is extended or adjusted under 35 U.S.C. 154(b) by 86 days.

(21) Appl. No.: 14/916,220

(22) PCT Filed: Sep. 29, 2014

(86) PCT No.: PCT/US2014/058006
§ 371 (c)(1),
(2) Date: Mar. 3, 2016

(87) PCT Pub. No.: WO2015/050811
PCT Pub. Date: Apr. 9, 2015

(65) Prior Publication Data
US 2016/0208136 A1  Jul. 21, 2016

Related U.S. Application Data

(60) Provisional application No. 61/885,592, filed on Oct. 2, 2013.

(51) Int. Cl.
C09D 175/08 (2006.01)
C08G 18/10 (2006.01)
C08G 18/24 (2006.01)
C08G 18/48 (2006.01)
C08G 18/62 (2006.01)
C08G 18/76 (2006.01)

(52) U.S. Cl.
CPC ............ *C09D 175/08* (2013.01); *C08G 18/10* (2013.01); *C08G 18/246* (2013.01); *C08G 18/4825* (2013.01); *C08G 18/4854* (2013.01); *C08G 18/6208* (2013.01); *C08G 18/7671* (2013.01)

(58) Field of Classification Search
CPC .. C08G 18/10; C08G 18/246; C08G 18/4825; C08G 18/4854; C08G 18/6208; C08G 18/7671; C09D 175/08
See application file for complete search history.

(56) References Cited

U.S. PATENT DOCUMENTS

| 3,437,366 | A | 4/1969 | Korchmar et al. | |
|---|---|---|---|---|
| 4,267,299 | A * | 5/1981 | Oechsle, III | ....... C08G 18/0895 528/48 |
| 4,285,854 | A | 8/1981 | Kageyama et al. | |
| 5,344,490 | A | 9/1994 | Roosen et al. | |
| 6,613,864 | B1 * | 9/2003 | Porter | ..................... C08G 18/10 528/58 |
| 6,825,268 | B2 * | 11/2004 | Maier | ................ C08G 18/0823 524/832 |
| 8,261,930 | B2 | 9/2012 | Satterfield et al. | |
| 2007/0249778 | A1 | 10/2007 | Clemens et al. | |
| 2010/0256296 | A1 * | 10/2010 | Hong | ..................... B82Y 30/00 524/590 |
| 2010/0256323 | A1 | 10/2010 | Athey et al. | |
| 2011/0098417 | A1 | 4/2011 | Worley et al. | |
| 2013/0018147 | A1 | 1/2013 | Anater et al. | |

FOREIGN PATENT DOCUMENTS

| EP | 0057488 | A2 | 8/1982 |
|---|---|---|---|
| EP | 0376674 | * | 7/1990 |

OTHER PUBLICATIONS

PCT/US2014/058006, International Search Report and Written Opinion dated Feb. 19, 2015.
PCT/US2014/058006, International Preliminary Report on Patentability dated Apr. 14, 2016.

* cited by examiner

Primary Examiner — Patrick D Niland

(57) ABSTRACT

A sprayable polyurethane based reaction system for forming a protective coating in industrial containers includes a first component and a second component, each having a viscosity less than 1500 cP at 25° C. A difference between the viscosities of the first component and the second component within a temperature range of 60° C. and 80° C. is from −150 cP to 150 cP. The first component is a reaction product of a polyol component that includes a first butylene oxide propylene oxide copolymer polyol having a polyoxybutylene content of at least 50 wt % and an isocyanate component that includes at least one polyisocyanate. The second component has a second butylene oxide propylene oxide copolymer polyol having a polyoxybutylene content of at least 50 wt %. At least one selected from a group of the polyol component and the second component includes a primary hydroxyl containing polyol.

10 Claims, No Drawings

SPRAYABLE POLYURETHANE BASED PROTECTIVE COATING

FIELD

Embodiments relate to a sprayable polyurethane based protective coating for use in large industrial containers such as frac tanks.

INTRODUCTION

Large industrial containers (e.g., industrial containers that hold more than 10,000 gallons) are often used to hold abrasive and/or corrosive materials, as such the containers are lined with a protective coating. For example, large industrial containers such as frac tanks are used in the oil and gas industry to store and transport hydraulic fracturing fluids to and from well sites. Since the hydraulic fracturing fluid may include corrosive materials such as hydrochloric acid and toxic solvents such as toluene and xylene, to reduce and/or minimize the possibility of leakage the frac tank (e.g., the interior) is lined with the protective coating. Due to the large surface area of the containers, protective coatings that both are sprayable onto large surface areas and impart chemical resistance are sought for use on surfaces of the large industrial containers.

With respect to protective coatings, a high solids content (i.e., from 90 wt % to 100 wt % solids) with a minimized amount of solvent or solvent-free formulations are sought, e.g., as discussed in U.S. Patent Publication No. 2007/0249778. Also, U.S. Pat. No. 8,261,930 discloses that a coating may be formed with an epoxy solids based system. However, there is a high occurrence of failure, e.g., due to cracking, in the epoxy based coatings especially in colder climates such as temperatures below 0° C. Further, U.S. Patent Publication No. 2007/0249778 discloses the use of polyurethane chemistry based on butadiene containing formulations for imparting chemical resistance in coatings. However, the high solids content is arrived at by mixing a polyhydroxyl terminated polymer of butadiene and a lower molecular weight second polyhydroxyl-terminated polybutadiene. In other words, the required use of a solvent is reduced by using different molecular weight butadiene compounds, but the resultant formulation may not be sprayable onto the large surface areas of large industrial containers based on the butadiene content.

In addition, it has been proposed that protective coatings formed of polyurethane-polyurea polymer system allow for high reactivity, speed of application, and strength and toughness, e.g., as discussed in U.S. Patent Publication No. 2011/0098417. Accordingly, reaction systems for forming protective coatings for large industrial containers such as frac tanks that both provide the requisite level of chemical resistance and are sprayable on to large surface areas are sought.

SUMMARY

Embodiments relate to a sprayable polyurethane based reaction system for forming a protective coating in industrial containers, and the reaction system includes a first component and a second component. The first component is a reaction product of a polyol component and an isocyanate component, in which the polyol component includes a first butylene oxide-propylene oxide copolymer polyol having a polyoxybutylene content of at least 50 wt % based on a total weight of the first butylene oxide-propylene oxide copolymer polyol and the isocyanate component includes at least one polyisocyanate, and a viscosity of the first component is less than 1500 cP at 25° C. The second component has a second butylene oxide-propylene oxide copolymer polyol having a polyoxybutylene content of at least 50 wt %, based on a total weight of the second butylene oxide-propylene oxide copolymer polyol, a viscosity of the second component is less than 1500 cP at 25° C., and a difference between the viscosities of the first component and the second component within a temperature range of 60° C. and 80° C. is from −150 cP to 150 cP. At least one selected from a group of the polyol component and the second component includes a primary hydroxyl containing polyol, and a reaction product of the first component and the second component has a tensile strength of at least 1500 psi and a percent elongation at break of at least 400.

DETAILED DESCRIPTION

Embodiments relate to a sprayable polyurethane based system (e.g., that includes polyurethane groups and polyurea groups) used for forming a protective coating on large industrial containers that has a tensile strength of at least 1500 psi and a percent elongation at break of at least 400. The formulation for forming the protective coating is both a sprayable solution and exhibits high reactivity when sprayed onto a surface of a large industrial container. Further, the resultant protective coating imparts chemical resistance, e.g., acid resistance, to the industrial container. Large industrial containers such as frac tanks (e.g., mobile frac tanks) are used for storing, transporting, and/or dispensing materials. For example, frac tanks may be used for storing, transporting, and dispensing materials such as fracturing liquids and drilling fluid for well sites. When empty, the frac tank may be moved from one site to another site to allow for reuse.

According to embodiments, the protective coating is formed by mixing at least a first component and a second component, each of which has a viscosity that is less than 1500 cP at 25° C. (e.g., between 5 cP and 1500 cP). For example, the first and second components are mixed immediately before being applied onto a surface of the industrial container by a spray mechanism, e.g., a direct impingement mixing plural component spray gun. The first component includes at least one isocyanate-terminated prepolymer that is a reaction product of a polyol component and an isocyanate component, in which the isocyanate component is present in a stoichiometrically excess amount (e.g., the first component includes one or more prepolymers that are collectively referred to as a reaction product of the polyol component and the isocyanate component). The polyol component includes a first butylene oxide-propylene oxide (BO/PO) copolymer polyol having a polyoxybutylene content of at least 50 wt %, based on a total weight of the first BO/PO copolymer polyol. The isocyanate component includes at least one polyisocyanate. The second component includes at least a second butylene oxide-propylene oxide (BO/PO) copolymer polyol, which has a polyoxybutylene content of at least 50 wt %, based on a total weight of the second BO/PO copolymer polyol. The polyol component for forming the first component may be the same as or similar to the second component.

According to embodiments, at least one selected from a group of the polyol component and the second component includes a primary hydroxyl containing polyol, e.g., that has a functionality from 1.6 to 3.5 and a number average molecular weight from 200 to 10,000 (e.g., 1000 to 5000, 1500 to 4000, 2000 to 3000, etc.). The primary hydroxyl containing polyol may have an average of 1.8 to 2.2 terminal hydroxyl groups. For example, the primary hydroxyl containing polyol is a polybutadiene, a polytetramethylene ether glycol (PTMEG), a polypropylene glycol (PPG), a polyoxypropylene, or a polyoxyethylene-polyoxypropylene. According to an exemplary embodiment, at least the first component includes two prepolymer components, a one prepolymer prepared with the first BO/PO copolymer polyol and a polyisocyanate, and a second prepolymer prepared with the primary hydroxyl containing polyol and a polyisocyanate. Accordingly to an exemplary embodiment, at least the first component includes one prepolymer component, which is prepared with a mixture of the first BO/PO copolymer polyol and the primary hydroxyl containing polyol, which mixture is reacted with a polyisocyanate to form the prepolymer component. According to an exemplary embodiment, at least the second component includes both the second BO/PO copolymer polyol and the primary hydroxyl containing polyol. The above exemplary embodiments may be variously combined within one formulation for forming a protective coating, e.g., an exemplary embodiment includes both a prepolymer prepared with the primary hydroxyl containing polyol and the primary hydroxyl containing polyol in the second component.

The first component includes at least one isocyanate-terminated prepolymer that is a reaction product of a composition that includes the polyol component and the isocyanate component. The composition for forming the first component may additionally include optional catalyst, optional curative, and/or pH neutralizer component(s). Each isocyanate-terminated prepolymer may have a free isocyanate group (NCO) content of 6 wt % to 20 wt % (e.g., 12 wt % to 17 wt %, 13 wt % to 16 wt %, etc.), based on the total weight of that isocyanate-terminated prepolymer. For example, the prepolymer may be prepared in an one-pot procedure.

According to embodiments, the polyol component includes the first BO/PO copolymer polyol, which may be a polyether polyol. The polyol component may include at least one other polyether or polyester polyol in addition to the first BO/PO copolymer polyol and the optional primary hydroxyl containing polyol.

The first BO/PO copolymer polyol has a greater weight percentage of polyoxybutylene than polyoxypropylene. For example, the first BO/PO copolymer polyol includes at least 50 wt %, at least 60 wt %, at least 70 wt %, at least 75 wt %, at least 80 wt %, and/or at least 85 wt % of polyoxybutylene units, of which a remainder based on 100 wt % total is accounted for with polyoxypropylene units. The first BO/PO copolymer polyol may have a number average molecular weight from 500 to 3,000 (e.g., 750 to 2,500, 1,000 to 2,200, etc.). The first BO/PO copolymer polyol may have a nominal average hydroxyl functionality from 1.6 to 3.5 (e.g., 1.8 to 3.2, 2 to 3, etc.). Accordingly to an exemplary embodiment, the first BO/PO copolymer polyol may be a diol or a triol, in which a total number average molecular weight of polyoxypropylene units is from 350 to 420 and a total number average molecular weight block of polyoxybutylene units is from 1500 to 1700. The polyol component may include at least one other polyether or polyester polyol in addition to the first BO/PO copolymer polyol and the optional primary hydroxyl containing polyol.

The first BO/PO copolymer polyol may be prepared by a polymerization reaction that includes adding propylene oxide and butylene oxide to an initiator having from 2 to 8 (e.g., 2 to 6, 2 to 4, etc.) active hydrogen atoms. A catalysis for the polymerization may be anionic or cationic. Exemplary catalysts include, e.g., KOH, CsOH, boron trifluoride, and double cyanide complex (DMC) catalysts such as a zinc hexacyanocobaltate or a quaternary phosphazenium compound.

When the polyol component of the first component contains an active hydroxyl group, the reaction of the active hydroxyl group with an isocyanate moiety in the isocyanate component results in the formation of a urethane linkage. For example, when an isocyanate-terminated end of a prepolymer reacts with a hydroxyl-terminated end of a polybutadiene polymer, a urethane linkage is formed. When the polyol component an active amine hydrogen group, the reaction of the active amine hydrogen group with the isocyanate component results in the formation of urea linkages. Further, reaction of one isocyanate moiety in the isocyanate component with another isocyanate moiety in the isocyanate component results in the formation of urea linkages. For example, when an isocyanate moiety of one isocyanate-terminated prepolymer reacts with another isocyanate moiety of another isocyanate-terminated prepolymer molecule, a urea linkage is formed.

The isocyanate component may include at least one polyisocyanate (e.g., a diisocyanate). Exemplary isocyanates include aromatic, cycloaliphatic, and aliphatic isocyanates. For example, isocyanates known in the art may be used. Exemplary isocyanates include the 4,4'-,2,4' and 2,2'-isomers of diphenylmethane diisocyante (MDI), blends thereof and polymeric and monomeric MDI blends, toluene-2,4- and 2,6-diisocyante (TDI) m- and p-phenylenediisocyanate, chlorophenylene-2,4-diisocyanate, diphenylene-4,4'-diisocyanate, 4,4'-diisocyanate-3,3'-dimethyldiphenyl, 3-methyldiphenyl-methane-4,4'-diisocyanate, diphenyletherdiisocyanate, 2,4,6-triisocyanatotoluene, 2,4,4'-triisocyanatodi phenylether, ethylene diisocyanate, and 1,6-hexamethylene diisocyanate. Derivatives of any of the foregoing polyisocyanate groups that contain, e.g., biuret, urea, carbodiimide, allophonate, and/or isocyanurate groups, may be used. According to an exemplary embodiment, the isocyanate component includes MDI, e.g., 40 to 99 wt % of the 4,4'-isomer of MDI.

The second component includes at least the second BO/PO copolymer polyol, which has a polyoxybutylene content of at least 50 wt %, based on a total weight of the second BO/PO copolymer polyol, and may optionally include the primary hydroxyl containing polyol. The second component may include optional catalyst, optional curative, pH neutralizer, optional chain extender, and/or optional crosslinker component(s).

The optional catalyst component may include at least one tin and/or amine based catalyst, e.g., that accounts for less than 5 wt % of a total weight of the second component. For example, a commercially available catalyst may be used. The optional curative component may include at least one amine based curing agent. If included, the optional curative component may account for 5 wt % to 50 wt % (e.g., 10 wt % to 45 wt %, 15 wt % to 40 wt %, 20 wt % to 35 wt %, etc.) of the total weight of the second component. For example the amine based curing agent may be a bifunctional organic diamine compound (such as a toluene based diamine, a phenyl based diamine, an alkyl based dianiline, a polyether based diamine, or an isophorone based diamine) or a trifunctional organic diamine compound (such as a phenyl based triamine, an alkyl based triamine, or a propylene based triamine). Exemplary amine based curing agents are available from Albemarle Corporation under the trademark Ethacure. According to an exemplary embodiment, the curative component may include a dimethyl toluene diamine curing agent.

The optional chain extender component may include at least one chain extender that has two isocyanate-reactive groups per molecule and may have an equivalent weight per isocyanate-reactive group of less than 400. For example, the chain extender may be blended with the second BO/PO copolymer polyol or may be provided separately during the formation of the first component. If included, the chain extender component may be present in an amount from 0.1 wt % to 15 wt % (e.g., 0.2 wt % to 10 wt %, etc.), based on a total weight of the second component. According to an exemplary embodiment, the chain extender is an amine based chain, which would introduce additional polyurea moieties.

The optional crosslinker component may include at least one crosslinker that has three or more isocyanate-reactive groups per molecule and an equivalent weight per isocyanate-reactive group of less than 400. For example, the crosslinker may include from 3 to 8 (e.g. 3 or 4) primary hydroxyl, primary amine, or secondary amine groups per molecule, and may have an average equivalent weight from 30 to about 300. If included, the crosslinker component may be present in an amount from 0.1 wt % to 15 wt % (e.g., 0.2 wt % to 10 wt %, etc.), based on a total weight of the second component. According to an exemplary embodiment, the crosslinker is an amine based chain, which would introduce additional polyurea moieties.

The primary hydroxyl containing polyol and/or units derived from the primary hydroxyl containing polyol (e.g., as incorporated into isocyanate-terminated prepolymers in the first component) may account for 5 wt % to 30 wt % (e.g., 7 wt % to 20 wt %, 10 wt % to 15 wt %, 12 wt % to 14 wt %, etc.), of a combined total weight of the first and second components. When the polyol component includes the primary hydroxyl container polyol, an amount of the first butylene oxide-propylene oxide copolymer polyol may be greater than an amount of the primary hydroxyl container polyol in the polyol component. When the second component includes the primary hydroxyl container polyol, an amount of the second butylene oxide-propylene oxide copolymer polyol may be greater than an amount of the primary hydroxyl container polyol in the second component.

According to an exemplary embodiment, the primary hydroxyl containing polyol may be a hydroxyl-terminated polybutadiene having a number average molecular weight from 500 to 10,000 (e.g., 700 to 8000, 1000 to 5000, 2000 to 3000, etc.). The hydroxyl-terminated polybutadiene may contain an average of 1.8 to 2.2 terminal hydroxyl groups. Commercially available hydroxyl-terminated polybutadiene resin may be used as the primary hydroxyl containing polyol (e.g., available from Cray Valley Hydrocabon Specialty Chemicals as Poly bd® R-45HTLO, Poly bd® R-45V, Poly bd® R-20LM, Krasol™ LBH 2000, Krasol™ LBH 3000, and Krasol™ LBH 5000).

Various other additives may be added to the first and/or second components to adjust characteristics of the resultant protective coating, e.g., those known to those skilled in the art may be used. For example, pigments (such as titanium dioxide and/or carbon black), may be used to impart color properties. Pigments may be in the form of solids or the solids may be pre-dispersed in a resin carrier. Reinforcements (e.g., flake or milled glass and/or fumed silica), may be used to impart certain properties. Other additives include, e.g., UV stabilizers, antioxidants, air release agents, and adhesion promoters, which may be independently used depending on the desired characteristics of the protective coating.

According to an exemplary, embodiment, a ratio of equivalents of isocyanate groups in the first component to the active hydrogen atoms in the second component is from 85 to 150 (e.g., 85 to 115, 90 to 110, etc.). As would be understood by a person of ordinary skill in the art, the isocyanate index is the molar equivalents of isocyanate (NCO) groups divided by the total molar equivalents of isocyanate-reactive hydrogen atoms present in a formulation, multiplied by 100.

A formulation for forming a protective coating that uses the first and second components (e.g., consists essentially of the first and second components) may exclude or minimize any solvent and/or diluent additives so that the formulation has a high solids content of at least 90 wt %, at least 95 wt %, at least 98 wt %, at least 99 wt %, at least 99.5 wt %, and/or 100 wt %. In particular, the formulation avoids the necessity of using solvent and/or diluent additives to adjust viscosity for forming a formulation that is sprayable onto large surface areas. A volume ratio of the first component to the second component in the formulation may be from 0.5:1.5 to 1.5:0.5 (e.g., 0.75:1.25 to 1.25:0.75, 0.9:1.1 to 1.1:0.9, 0.95:1.05 to 1.05:0.95, etc.) within a temperature range of 60° C. and 80° C.

According to an exemplary embodiment, the first component and the second component may be mixed in a ratio of approximately 0.95:1.05 to 1.05:0.95 within the temperature range of 60° C. and 80° C., which when mixed in such a volume ratio the resultant formulation is sprayable from industrial spray equipment. For example, the first component and the second component may each be sprayed from the industrial spray equipment, without adding any solvents and/or diluents, at a volume ratio of 0.95:1.05 to 1.05:0.95 such that reactivity of the components may be optimized. In particular, when solvent and/or diluents are added to form a sprayable formulation and the industrial spray equipment has a spray volume of approximately 1:1, reactivity may be diminished due to the lack of a sufficient amount of reactants. Accordingly, physical properties of the resultant sprayed protective coating may also be diminished when solvents and/or diluents are added to form a formulation that is sprayable onto large surface areas.

The protective coating is both formed by using spray equipment and exhibits chemical resistance in abrasive and/or corrosive environments. The protective coating may be applied via plural component high pressure spray machines onto a surface of a large industrial container such as a frac tank. The plural component equipment may combine and/or mix the first component and second component, e.g., the first and second components may be combined or mixed under high pressure such as 1000 psi to 3000 psi. The first and second components may also be heated, e.g., within the spray equipment, to an application temperature within the range of 60° C. and 80° C. The first and second components, which are sprayed from the spray equipment, each of which has a viscosity of less than 1500 cP at 25° C. (e.g., without adding any solvents and/or diluents). At 25° C. the viscosity of the first component may be less than the viscosity of the second component, e.g., the viscosity of the first component may be less than 1000 cP (e.g., between 5 cP and 1000 cP, between 5 cP and 800 cP At 60° C., etc.). The viscosities of the first component and the second component may each be less than 220 cP (e.g., between 5 cP and 220 cP). At 80° C., the viscosities of the first component and the second component may each be less than 110 cP (e.g., between 5 cP and 110 cP).

The resultant protective coating has an initial tensile strength of at least 1500 psi and an initial percent elongation at break of at least 400. After exposure (e.g., immersion) for seven days at 25° C. to a 37 wt % solution of hydrogen chloride in water, the protective coating may still have a tensile strength of at least 500 psi and a percent elongation at break of at least 300. After exposure (e.g., immersion) for seven days at 25° C. to a 30 wt % solution of sulfuric acid in water, the protective coating may maintain the tensile strength of at least 1500 psi and the percent elongation at break of at least 400 after exposure. After exposure (e.g., immersion) for seven days at 25° C. exposure to diesel fuel, the protective coating may still have a tensile strength of at least 500 psi and a second percent elongation at break of at least 100.

All parts and percentages are by weight, unless indicated otherwise. All values for molecular weight are based on number average molecular weight, unless indicated otherwise.

EXAMPLES

A description of the materials used in the examples is as follows:

| | |
|---|---|
| BO/PO Polyol | A copolymer polyol including polyoxypropylene units (with a number average molecular weight of 390) and polyoxybutylene units (with a number average molecular weight of 1600), having an average nominal hydroxyl functionality of 2, a total number average molecular weight of 2000, and a propylene oxide content of approximately 20 wt % and a polybutylene oxide content of approximately 80 wt %, based on a total weight of the copolymer polyol. |
| BO Polyol | A polybutylene oxide based polyol, having a functionality of approximately 2, an OH number of from approximately 54 to 58 mg KOH/g, a number average molecular weight of approximately 2000 g/mol. |
| Polyether Polyol | A polyether polyol (available from The Dow Chemical Company as VORANOL ™ 360.) |
| Poly bd ® | A liquid including 99.9 wt % of a primary hydroxyl-terminated polybutadiene, having a number average molecular weight of 2800, an average hydroxyl number of 47.1 KOH/g, an average nominal hydroxyl functionality of 2.4-2.6 (available from Cray Valley as Poly bd ® R-45HTLO). |
| ISONATE ™ 50 OP | A polymeric MDI mixture that includes 50 wt % of 4,4'-methylene diphenyl isocyanate and 50 wt % of 2,4'-methylene diphenyl isocyanate (available from The Dow Chemical Company). |
| ETHACURE ® 100 | A curing agent consisting of a mixture of mostly 3,5-dimethylthio-2,6-toluenediamine, 3,5-dimethylthio-2,4-toluenediamine, and dialkylated m-phenylenediamines (available from Albemarle Corporation). |
| ETHACURE ® 300 | A curing agent consisting of a mixture of mostly 3,5-dimethylthio-2,6-toluenediamine and 3,5-dimethylthio-2,4-toluenediamine (available from Albemarle Corporation). |
| Dabco ® T-12 | A dibutyltin dilaurate catalyst (available from Air Products). |
| BiCAT ® 8 | A catalyst including from 7.8-8.2% of bismuth (available from Shepard). |
| BiCAT ® Z | A catalyst including from 18.7-19.3% of zinc (available from Shepard). |
| VORASTAR ® 6490 | A Jeffamine based aromatic polyurea (available from The Dow Chemical Chemical). |
| VORASTAR ® 6320 | A polybutadiene based aromatic polyurea (available from The Dow Chemical Company). |

Working Example 1

A BO/PO prepolymer is prepared using the BO/PO Polyol and ISONATE™ 50 OP. In particular, 53 grams of ISONATE™ 50 OP is added to a three neck round bottom flask at 25° C. Next, one drop of benzoyl chloride is added to the three neck round bottom flash while purging with dry nitrogen is performed. Then, 47 grams of the BO/PO Polyol is added to the flask at room temperature to form a reaction mixture. The reaction mixture is stirred using an overhead stirrer at 300 rpm and heated to 80° C. over the course of a half an hour to facilitate formation of prepolymers in the reaction mixture. The reaction mixture is maintained at 80° C. for an additional 2.5 hours. After 3 hours, while still at a temperature near 80° C., the reaction mixture is transferred to a glass jar and degassed in a vacuum chamber for a half an hour. The resultant prepolymers in the reaction mixture have a free isocyanate group (i.e., NCO) content of approximately 15.8 wt %.

A polybutadiene prepolymer is prepared using Poly bd® and ISONATE™ 50 OP using the procedure as used to prepare the BO/PO prepolymer. In particular, 53 grams of ISONATE™ 50 OP is added to a three neck round bottom flask at 25° C. Next, one drop of benzoyl chloride is added to the flash while purging with dry nitrogen is performed. Then, 47 grams of the Poly bd® is added to the flask at room temperature to form a reaction mixture. The resultant prepolymers in the reaction mixture have a free isocyanate group (i.e., NCO) content of approximately 15.8 wt %.

Plaques for Working Example 1 and Comparative Examples A, B, and C are prepared according to the formulations in Table 1, below.

TABLE 1

| Side | | Working Example 1 | Comparative Example A | Comparative Example B | Comparative Example C |
|---|---|---|---|---|---|
| A | PO/BO Prepolymer (wt %) | 50 | — | 50 | — |
| | Polybutadiene Prepolymer (wt %) | — | 50 | — | 50 |
| B | PO/BO Polyol (wt %) | 24 | 35 | 35 | — |
| | Poly bd ® (wt %) | 11 | — | — | 35 |
| | Dabco ® T-12 (wt %) | <0.01 | <0.01 | <0.01 | <0.01 |
| | ETHACURE ® 300 (wt %) | 15 | 15 | 15 | 15 |

Referring to Table 2, below, the tensile strength and percent elongation at break for samples of Working Example 1 and Comparative Examples A, B, and C are evaluated for change after chemical exposure. In particular, samples are evaluated for each of immersion in a 37 wt % solution of hydrogen chloride in water, immersion in a 30 wt % solution of sulfuric acid in water, and immersion in diesel fuel. In particular, the chemical exposure tests are performed by immersing 2×2 inch samples of each of Working Example 1 and Comparative Examples A, B, and C in the indicated medium at ambient temperature for a period of seven days at a temperature of 25° C. After the exposure period, samples immersed in hydrogen chloride and sulfuric acid are rinsed with DI water, patted dry with a paper towel, and stored in Ziploc bags. Samples immersed in diesel fuel are rinsed twice with acetone followed by washing with DI water, patted dry, and stored in Ziploc bags. Replicated "dog bones" were cut from each square sample for analysis. Hardness (Shore A) is determined according to ASTM D-2240, and tensile strength and percent elongation at break are determined according to ASTM D-1708.

TABLE 2

|  | Working Example 1 | Comparative Example A | Comparative Example B | Comparative Example C |
|---|---|---|---|---|
| Shore A Hardness | 92 | 91 | 88 | 92 |
| Initial Tensile Strength (psi) | 2056 | 2402 | 1261 | 2208 |
| Initial Percent Elongation at Break at 25° C. | 446 | 383 | 174 | 217 |
| Hydrogen Chloride Solution (37 wt %) | | | | |
| Tensile Strength (psi) | 742 | 1435 | 263 | 1001 |
| Percent Elongation at Break at 25° C. | 350 | 320 | 57 | 64 |
| Sulfuric Acid Solution (30 wt %) | | | | |
| Tensile Strength (psi) | 1951 | 2428 | 1224 | 2130 |
| Percent Elongation at Break at 25° C. | 452 | 384 | 181 | 210 |
| Diesel Fuel | | | | |
| Tensile Strength (psi) | 905 | 1201 | 605 | 1038 |
| Percent Elongation at Break at 25° C. | 156 | 222 | 97 | 115 |

Referring to Table 3, below, the viscosities of sides A and B, for each of Working Example 1 and Comparative Examples A, B, and C, are evaluated for change over a temperature range of 25° C. to 80° C. The viscosity is determined using a parallel plate rheometer under oscillatory strain at a frequency of 10 Hz.

With respect to Comparative Example A, an initial viscosity and a difference of viscosities of sides A and B within the temperature range of 60° C. and 80° C. is demonstrated as too high for use as a sprayable system (see Table 3). With respect to Comparative Example B, a tensile strength and a percent elongation at break are demonstrated as too low for use in abrasive and/or corrosive environments (see Table 2). With respect to Comparative Example C, initial viscosities for both sides A and B are demonstrated as too high for use as a sprayable system (see Table 3).

Working Example 2

A BO prepolymer is prepared using the BO Polyol and ISONATE™ 50 OP, according to the formulation in Side A of Table 4, below. In particular, 57 grams of ISONATE™ 50 OP is added to a three neck round bottom flask at 25° C. Next, one drop of benzoyl chloride is added to the three neck round bottom flash while purging with dry nitrogen is performed. Then, 43 grams of the BO Polyol is added to the flask at room temperature to form a reaction mixture. The reaction mixture is stirred using an overhead stirrer at 300 rpm and heated to 80° C. over the course of a half an hour to facilitate formation of prepolymers in the reaction mixture. The reaction mixture is maintained at 80° C. for an additional 2.5 hours. After 3 hours, while still at a temperature near 80° C., the reaction mixture is transferred to a glass jar and degassed in a vacuum chamber for a half an hour. The free isocyanate content of this material (% NCO) is approximately 16.5%.

The Side B components in Table 4 are first assembled by the addition of BiCAT® 8, the polyols (see formulations below), and ETHACURE® 100 to a 15 gallon steel drum. These components are mixed for 10 minute using a drill bit mixer attached to a hand held drill.

A plaque for Working Example 2 is prepared according to the formulations in Table 4, below.

TABLE 3

| | Working Example 1 | | | Comparative Example A | | | Comparative Example B | | | Comparative Example C | | |
|---|---|---|---|---|---|---|---|---|---|---|---|---|
| | A | B | B − A | A | B | B − A | A | B | B − A | A | B | B − A |
| Viscosity at 25° C. (cP) | 604 | 1340 | 736 | 2479 | 712 | −1767 | 604 | 712 | 108 | 2479 | 2798 | 319 |
| Viscosity at 40° C. (cP) | 268 | 576 | 308 | 1226 | 271 | −955 | 268 | 271 | 3 | 1226 | 1323 | 97 |
| Viscosity at 50° C. (cP) | 164 | 339 | 175 | 795 | 150 | −645 | 164 | 150 | −14 | 795 | 814 | 19 |
| Viscosity at 60° C. (cP) | 106 | 215 | 109 | 543 | 91 | −452 | 106 | 91 | −15 | 543 | 533 | −10 |
| Viscosity at 70° C. (cP) | 73 | 144 | 71 | 388 | 60 | −328 | 73 | 60 | −13 | 388 | 366 | −22 |
| Viscosity at 80° C. (cP) | 52 | 102 | 51 | 288 | 41 | −247 | 52 | 41 | −11 | 288 | 262 | −26 |

TABLE 4

| Side | | Working Example 2 (wt %) |
|---|---|---|
| A | BO Polyol | 50.0 |
| | ISONATE ™ 50 OP | 57.0 |
| | Benzyl Chloride | <0.01 |
| B | BO Polyol | 65.7 |
| | Polyether Polyol | 15.0 |
| | ETHACURE ® 100 | 19.0 |
| | BiCAT ® 8 | 0.2 |
| | BiCAT ® Z | 0.1 |

In addition, plaques are prepared for Comparative Examples D and E, using VORASTAR® 6490 and VORASTAR® 6320, respectively.

In particular, the plaques (i.e., polyurea sample sheets) are prepared using an ISOTHERM high pressure spray machine. Side B is heated to 160° F. and Side A is heated to 140° F. using an inline heating element. The plaques are sprayed at a 1:1 ratio (by volume) using a Graco Fusion direct impingement mix mechanical purge spray gun. The plaques are sprayed on self-releasing low energy surface (in this case polyethylene boards at a thickness of approximately 3 mm) The plaques are conditioned at 25° C. for 7 days prior to testing.

TABLE 5

| | Working Example 2 | Comparative Example D | Comparative Example E |
|---|---|---|---|
| Effective Gel Time (seconds) | 10 | 15 | 5 |
| Tack Free Time (seconds) | 30 | 40 | 30 |
| Initial Tensile Strength (psi) | 1784 | 2020 | 1410 |
| Initial Percent Elongation at Break at 25° C. | 171 | 221 | 97 |
| Hydrogen Chloride Solution (28 wt %) | | | |
| Tensile Strength (psi) | 1626 | 362 | 1370 |
| Percent Elongation at Break at 25° C. | 186 | 276 | 124 |
| Percent Mass Change | 4 | 100 | 1 |
| Diesel Fuel | | | |
| Tensile Strength (psi) | 1044 | 986 | 537 |
| Percent Elongation at Break at 25° C. | 128 | 101 | 57 |
| Percent Mass Change | 25 | 21 | 48 |

Referring to Table 5, above, the tensile strength and percent elongation at break for samples of Working Example 2 and Comparative Examples D and E are evaluated for change after chemical exposure. In particular, samples are evaluated for each of immersion in a 37 wt % solution of hydrogen chloride in water and immersion in diesel fuel. In particular, the chemical exposure tests are performed by immersing 2×2 inch samples of each of Working Example 2 and Comparative Examples D and E in the indicated medium at ambient temperature for a period of seven days at a temperature of 25° C. After the exposure period, samples immersed in hydrogen chloride are rinsed with DI water, patted dry with a paper towel, and stored in Ziploc bags. Samples immersed in diesel fuel are rinsed twice with acetone followed by washing with DI water, patted dry, and stored in Ziploc bags. Replicated "dog bones" were cut from each square sample for analysis. Tensile strength and percent elongation at break are determined according to ASTM D-1708. Effective gel time is the time in seconds from the beginning of the mixing process until a toothpick or tongue depressor can be pulled from the sample without the material sticking to the toothpick or tongue depressor. Tack free time is the time in seconds from the beginning of the mixing process until the top surface of the sample is not sticky to the finger of the operator. Percent mass change is calculated as [(initial mass−final mass)/initial mass]*100).

The invention claimed is:

1. A sprayable polyurethane based reaction system for forming a protective coating in industrial containers, the reaction system comprising:
    a first component that is a reaction product of a polyol component and an isocyanate component, the polyol component including a first butylene oxide-propylene oxide copolymer polyol having a polyoxybutylene content of at least 50 wt % based on a total weight of the first butylene oxide-propylene oxide copolymer polyol and the first butylene oxide-propylene oxide copolymer polyol being a polyether polyol, the isocyanate component including at least one polyisocyanate, and a viscosity of the first component being less than 1500 cP at 25° C.; and
    a second component that includes a second butylene oxide-propylene oxide copolymer polyol having a polyoxybutylene content of at least 50 wt %, based on a total weight of the second butylene oxide-propylene oxide copolymer polyol and the second butylene oxide-propylene oxide copolymer polyol being a polyether polyol, a viscosity of the second component being less than 1500 cP at 25° C., and a difference between the viscosities of the first component and the second component within a temperature range of 60° C. and 80° C. being from −150 cP to 150 cP,
    wherein at least one selected from a group of the polyol component and the second component includes a primary hydroxyl containing polyol, and a reaction product of the first component and the second component has a tensile strength of at least 1500 psi and a percent elongation at break of at least 400.

2. The reaction system as claimed in claim 1, wherein:
    the first butylene oxide-propylene oxide copolymer polyol and the second butylene oxide-propylene oxide copolymer polyol each independently have a functionality from 1.6 to 3.5 and a number average molecular weight from 1500 to 3000, and
    the primary hydroxyl containing polyol has a functionality from 1.6 to 3.5 and a number average molecular weight from 200 to 10,000.

3. The reaction system as claimed in claim 1, wherein the viscosities of the first component and the second component at 60° C. are each less than 220 cP and the viscosities of the first component and the second component at 80° C. are each less than 110 cP.

4. The reaction system as claimed in claim 1, wherein the polyol component includes the primary hydroxyl container polyol and the amount by weight percentage of the first butylene oxide-propylene oxide copolymer polyol in the polyol component is greater than the amount by weight percentage of the primary hydroxyl containing polyol in the polyol component.

5. The reaction system as claimed in claim 1, wherein the second component includes the primary hydroxyl container polyol and the amount by weight percentage of the second butylene oxide-propylene oxide copolymer polyol in the second component is greater than the amount by weight percentage of the primary hydroxyl containing polyol in the second component.

6. The reaction system as claimed in claim 1, wherein the volume ratio of the first component to the second component is from 0.95:1.05 to 1.05:0.95 within the temperature range of 60° C. and 80° C.

7. The reaction system as claimed in claim 1, wherein the second component includes a curative component that has at least one amine based curing agent, the curative component accounting for 5 wt % to 50 wt % of a total weight of the second component.

8. The reaction system as claimed in claim 1, wherein at least one selected from the group of units derived from the primary hydroxyl containing polyol in the first component and the primary hydroxyl containing polyol in the second component account for 5 wt % to 30 wt % of a combined total weight of the first and second components.

9. A protective coating formed from the reaction system according to claim 1, the protective coating having a tensile strength of at least 1500 psi and a percent elongation at break of at least 400.

10. The protective coating as claimed in claim 9, wherein:
the protective coating has a second tensile strength of at least 500 psi and a second percent elongation at break of at least 300 after exposure for seven days at 25° C. to a 37 wt % solution of hydrogen chloride in water,
the protective coating maintains the tensile strength of at least 1500 psi and the percent elongation at break of at least 400 after exposure for seven days at 25° C. to a 30 wt % solution of sulfuric acid in water, and
the protective coating has a third tensile strength of at least 500 psi and a second percent elongation at break of at least 100 after exposure for seven days at 25° C. exposure to diesel fuel.

* * * * *